US012569961B2

(12) United States Patent
Dai

(10) Patent No.: US 12,569,961 B2
(45) Date of Patent: Mar. 10, 2026

(54) IMPACT TOOL ANVIL WITH IMPROVED DETENT PIN

(71) Applicant: MILWAUKEE ELECTRIC TOOL CORPORATION, Brookfield, WI (US)

(72) Inventor: Zhipeng Dai, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 721 days.

(21) Appl. No.: 17/863,610

(22) Filed: Jul. 13, 2022

(65) Prior Publication Data

US 2023/0013436 A1 Jan. 19, 2023

(30) Foreign Application Priority Data

Jul. 13, 2021 (CN) .......................... 202121592187.0

(51) Int. Cl.
| | |
|---|---|
| *B25B 23/00* | (2006.01) |
| *B25B 21/02* | (2006.01) |
| *F16B 2/16* | (2006.01) |

(52) U.S. Cl.
CPC .......... *B25B 23/0035* (2013.01); *B25B 21/02* (2013.01); *F16B 2/16* (2013.01)

(58) Field of Classification Search
CPC . F16B 2/16; Y10T 403/32483; B25B 23/0035
See application file for complete search history.

(56) References Cited

U.S. PATENT DOCUMENTS

| | | | |
|---|---|---|---|
| 5,390,571 A | 2/1995 | Fox, III et al. | |
| 7,207,393 B2 | 4/2007 | Clark, Jr. et al. | |
| 8,667,875 B2 | 3/2014 | Haman | |
| 9,669,526 B2 | 6/2017 | Ely | |

(Continued)

FOREIGN PATENT DOCUMENTS

| | | | | |
|---|---|---|---|---|
| EP | 2 204 265 | * | 7/2010 | ......... B25B 23/0014 |
| KR | 20180065740 A | | 6/2018 | |

(Continued)

OTHER PUBLICATIONS

International Search Report and Written Opinion for Application No. PCT/US2022/036908 dated Dec. 27, 2022 (11 pages).

(Continued)

*Primary Examiner* — Michael P Ferguson
(74) *Attorney, Agent, or Firm* — Michael Best & Friedrich LLP

(57) ABSTRACT

An impact tool includes a housing, an anvil extending from the housing, a tool element removably coupled to the anvil, a drive assembly to impart rotational impacts to the anvil, and a detent system supported by the anvil. The detent system includes a detent pin defining a longitudinal center axis and having a notch disposed on only one side of a longitudinal mid-plane containing the longitudinal center axis, and a retaining pin received within the notch. The detent pin is movable relative to the anvil between an extended position and a retracted position, the detent pin is configured to engage the tool element to retain the tool element on the anvil when the detent pin is in the extended position, the detent pin is biased toward the extended position, and the retaining pin engages an end of the notch to limit movement of the detent pin to the extended position.

17 Claims, 6 Drawing Sheets

(56)         References Cited

U.S. PATENT DOCUMENTS

| | | | |
|---|---|---|---|
| 2004/0182206 | A1 | 9/2004 | Korpi |
| 2010/0147117 | A1* | 6/2010 | Hsieh ........................ B25G 3/18 |
| | | | 81/177.85 |
| 2012/0304836 | A1 | 12/2012 | Haman |
| 2020/0230789 | A1 | 7/2020 | Dey, IV et al. |

FOREIGN PATENT DOCUMENTS

| | | | | |
|---|---|---|---|---|
| WO | WO 2013/164206 | * | 11/2013 | ........... B25B 13/461 |
| WO | WO 2014/154400 | * | 10/2014 | ......... B25B 23/0035 |

OTHER PUBLICATIONS

Extended European Search Report for Application No. 22842790.2 dated Apr. 30, 2025 (9 pages).

* cited by examiner

IMPACT TOOL ANVIL WITH IMPROVED DETENT PIN

CROSS-REFERENCE TO RELATED APPLICATIONS

This application claims priority to Chinese Utility Model Application No. 202121592187.0, filed Jul. 13, 2021, the entire content of which is incorporated herein by reference.

FIELD OF THE INVENTION

The present invention relates to impact tools, and more particularly, to anvils for impact tools.

BACKGROUND OF THE INVENTION

Impact tools or wrenches are typically utilized to provide a striking rotational force, or intermittent applications of torque, to a tool element or workpiece (e.g., a fastener) to either tighten or loosen the fastener. Impact wrenches are typically used where high torque is needed, such as to tighten relatively large fasteners or to loosen or remove stuck fasteners (e.g., an automobile lug nut on an axle stud) that are otherwise not removable or very difficult to remove using hand tools.

SUMMARY OF THE INVENTION

The present invention provides, in a first aspect, an impact tool including a housing, an anvil extending from the housing, a tool element removably coupled to the anvil, a drive assembly configured to impart rotational impacts to the anvil, and a detent system supported by the anvil. The detent system includes a detent pin defining a longitudinal center axis and having a notch disposed on only one side of a longitudinal mid-plane containing the longitudinal center axis, and a retaining pin received within the notch. The detent pin is movable relative to the anvil between an extended position and a retracted position, the detent pin is configured to engage the tool element to retain the tool element on the anvil when the detent pin is in the extended position, the detent pin is biased toward the extended position, and the retaining pin engages an end of the notch to limit movement of the detent pin to the extended position. The notch includes a first surface extending parallel to the longitudinal center axis, a second surface extending at an oblique angle from the first surface, and a third surface extending at an oblique angle from the first surface.

The present invention provides, in a second aspect, an impact tool including a housing, an anvil extending from the housing, a tool element removably coupled to the anvil, a drive assembly configured to impart rotational impacts to the anvil, and a detent system supported by the anvil. The detent system includes a detent pin defining a longitudinal center axis and having a notch, and a retaining pin received within the notch. The detent pin is movable along the longitudinal center axis relative to the anvil between an extended position and a retracted position, the detent pin is configured to engage the tool element to retain the tool element on the anvil when the detent pin is in the extended position, and the retaining pin is resiliently deformable to bias the detent pin toward the extended position.

The present invention provides, in a third aspect, an anvil configured to receive impacts from a hammer of an impact tool. The anvil includes a plurality of anvil lugs configured to receive impacts from the hammer, a driving end portion configured to receive a tool element thereon, the driving end portion including a bore, a detent pin received within the bore and defining a longitudinal center axis, the detent pin having a notch disposed on only one side of a longitudinal mid-plane containing the longitudinal center axis, and a retaining pin received within the notch. The notch has a beveled configuration. The detent pin is movable relative to the anvil between an extended position and a retracted position, the detent pin is biased toward the extended position, and the retaining pin engages an end of the notch to limit movement of the detent pin to the extended position.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
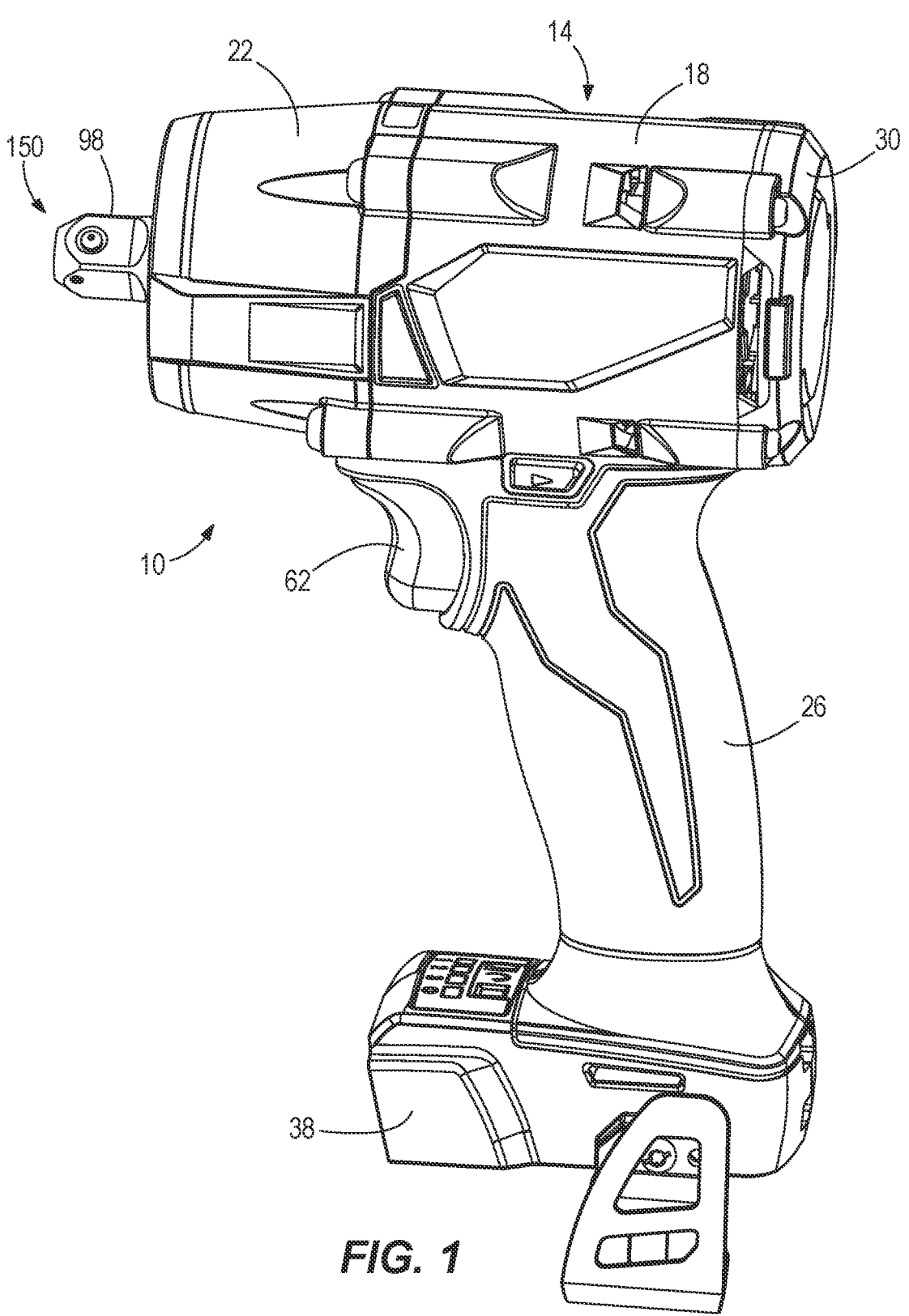
FIG. 1 is a perspective view of an impact tool according to an embodiment of the invention.

FIG. 1 illustrates an impact tool 10 in the form of an impact wrench. The impact wrench 10 includes a housing 14 with a motor housing portion 18, a front housing portion 22 coupled to the motor housing portion 18 (e.g., by a plurality of fasteners), and a handle portion 26 extending downward from the motor housing portion 18. In the illustrated embodiment, the handle portion 26 and the motor housing portion 18 are defined by cooperating clamshell halves. The illustrated housing 14 also includes an end cap 30 coupled to the motor housing portion 18 opposite the front housing portion 22.

Figure 2:
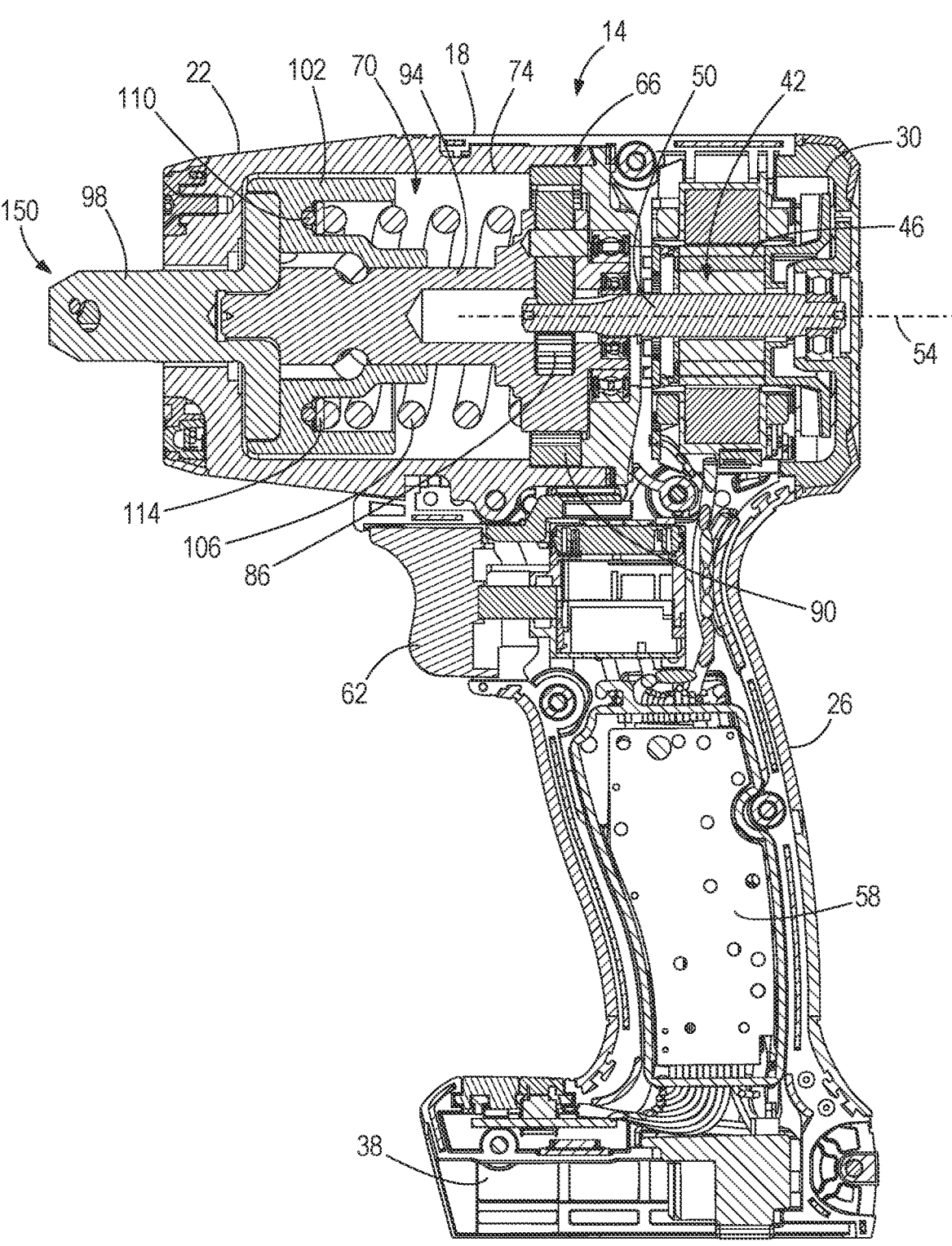
FIG. 2 is a cross-sectional view of the impact tool of FIG. 1.

Referring to FIGS. 1 and 2, the impact wrench 10 has a battery (not shown) removably coupled to a battery receptacle 38 located at a bottom end of the handle portion 26. An electric motor 42 (FIG. 2), supported within the motor housing portion 18, receives power from the battery via the battery receptacle 38 when the battery is coupled to the battery receptacle 38. In the illustrated embodiment, the motor 42 is a brushless direct current ("BLDC") motor with a stator 46 and an output shaft or rotor 50 that is rotatable about an axis 54 relative to the stator 46. In other embodiments, other types of motors may be used.

The impact wrench 10 also includes a switch (e.g., trigger switch 62) supported by the housing 14 that selectively electrically connects the motor 42 and the battery via a controller 58 (including, amongst other components, a printed circuit board having one or more microprocessors and multiple field-effect transducers) to provide power to the motor 42. In other embodiments, the impact wrench 10 may include a power cord for electrically connecting the switch 62 and the motor 42 to a source of AC power. As a further alternative, the impact wrench 10 may be configured to operate using a different power source (e.g., a pneumatic or hydraulic power source, etc.).

Referring to FIG. 2, the impact wrench 10 further includes a gear assembly 66 coupled to the motor output shaft 50 and a drive assembly 70 coupled to an output of the gear assembly 66. The gear assembly 66 may be configured in any of a number of different ways to provide a speed reduction between the output shaft 50 and an input of the drive assembly 70. The gear assembly 66 is at least partially housed within a gear case 74 fixed to the housing 14. In the illustrated embodiment, the fasteners that secure the front housing portion 22 to the motor housing portion 18 also pass through the gear case 74 to fix the gear case 74 relative to the housing 14.

The gear assembly 66 includes a pinion formed on the motor output shaft 50, a plurality of planet gears 86 meshed with the pinion, and a ring gear 90 meshed with the planet gears 86 and rotationally fixed within the gear case 74. The planet gears 86 are mounted on a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotate the camshaft 94.

The drive assembly 70 includes an anvil 98, extending from the front housing portion 22, to which a tool element (e.g., a socket, not shown) can be coupled for performing work on a workpiece (e.g., a fastener). The drive assembly 70 is configured to convert the constant rotational force or torque provided by motor 42 via the gear assembly 66 to a striking rotational force or intermittent applications of torque to the anvil 98 when the reaction torque on the anvil 98 (e.g., due to engagement between the tool element and a fastener being worked upon) exceeds a certain threshold. In the illustrated embodiment of the impact wrench 10, the drive assembly 70 includes the camshaft 94, a hammer 102 supported on and axially slidable relative to the camshaft 94, and the anvil 98.

With continued reference to FIG. 2, the drive assembly 70 further includes a spring 106 biasing the hammer 102 toward the front of the impact wrench 10 (i.e., in the left direction of FIG. 2). In other words, the spring 106 biases the hammer 102 in an axial direction toward the anvil 98, along the axis 54. A thrust bearing 110 and a thrust washer 114 are positioned between the spring 106 and the hammer 102. The thrust bearing 110 and the thrust washer 114 allow for the spring 106 and the camshaft 94 to continue to rotate relative to the hammer 102 after each impact strike when lugs (not shown) on the hammer 102 engage with corresponding anvil lugs 120 (FIG. 3A) and rotation of the hammer 102 momentarily stops. The camshaft 94 further includes cam grooves (not shown) in which corresponding cam balls (not shown) are received. The cam balls are in driving engagement with the hammer 102 and movement of the cam balls within the cam grooves allows for relative axial movement of the hammer 102 along the camshaft 94 when the hammer lugs and the anvil lugs 120 are engaged and the camshaft 94 continues to rotate.

In operation of the impact wrench 10, an operator depresses the switch 62 to activate the motor 42, which continuously drives the gear assembly 66 and the camshaft 94 via the output shaft 50. As the camshaft 94 rotates, the cam balls drive the hammer 102 to co-rotate with the camshaft 94, and the drive surfaces of hammer lugs engage, respectively, the driven surfaces of the anvil lugs 120 to provide an impact and to rotatably drive the anvil 98 and the tool element. After each impact, the hammer 102 moves or slides rearward along the camshaft 94, away from the anvil 98, so that the hammer lugs disengage the anvil lugs 120. As the hammer 102 moves rearward, the cam balls situated in the respective cam grooves in the camshaft 94 move rearward in the cam grooves 124. The spring 106 stores some of the rearward energy of the hammer 102 to provide a return mechanism for the hammer 102. After the hammer lugs disengage the respective anvil lugs 120, the hammer 102 continues to rotate and moves or slides forwardly, toward the anvil 98, as the spring 106 releases its stored energy, until the drive surfaces of the hammer lugs re-engage the driven surfaces of the anvil lugs 120 to cause another impact.

Figure 3A:
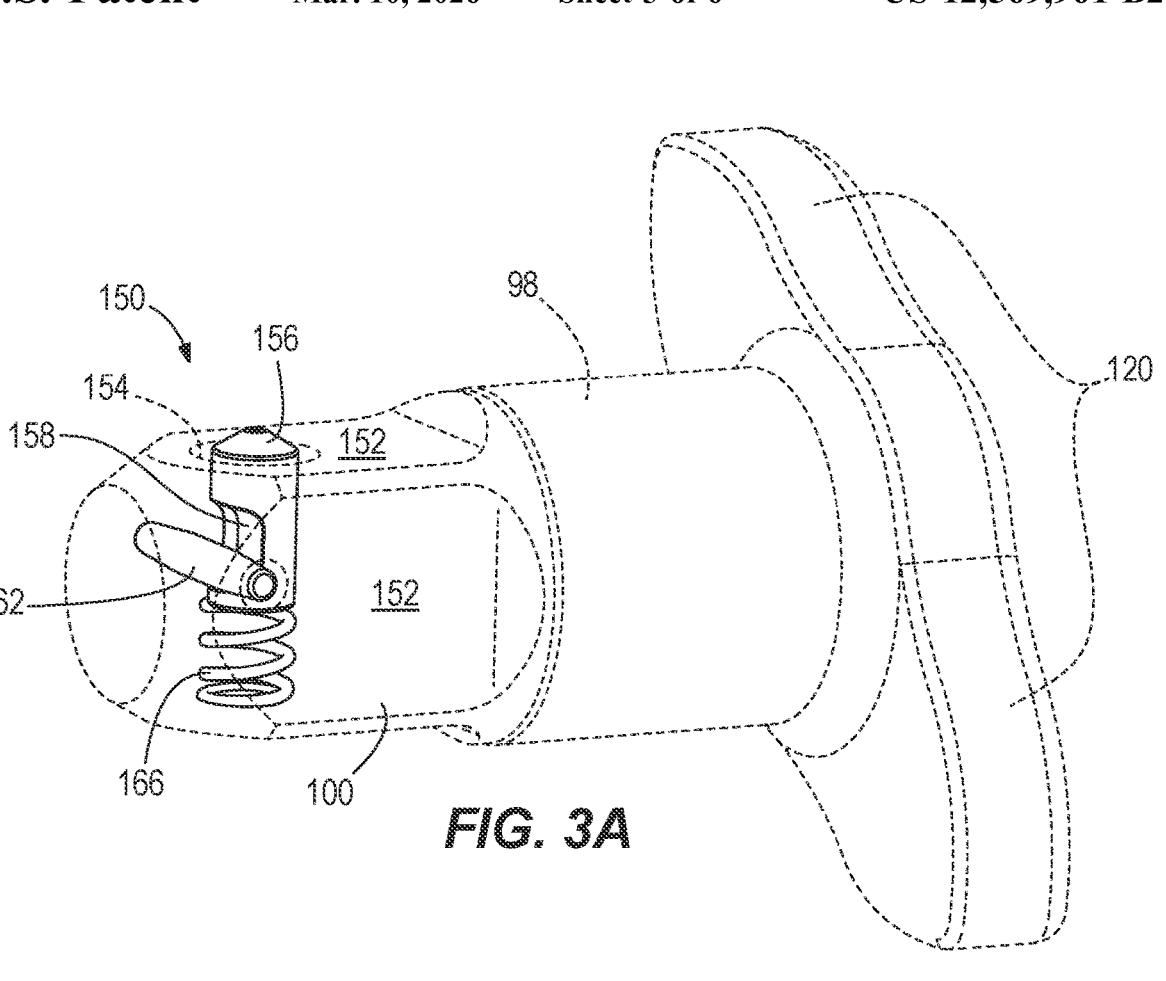
FIG. 3A is a perspective view of an anvil for use with the impact tool of FIG. 1.
Figure 3B:
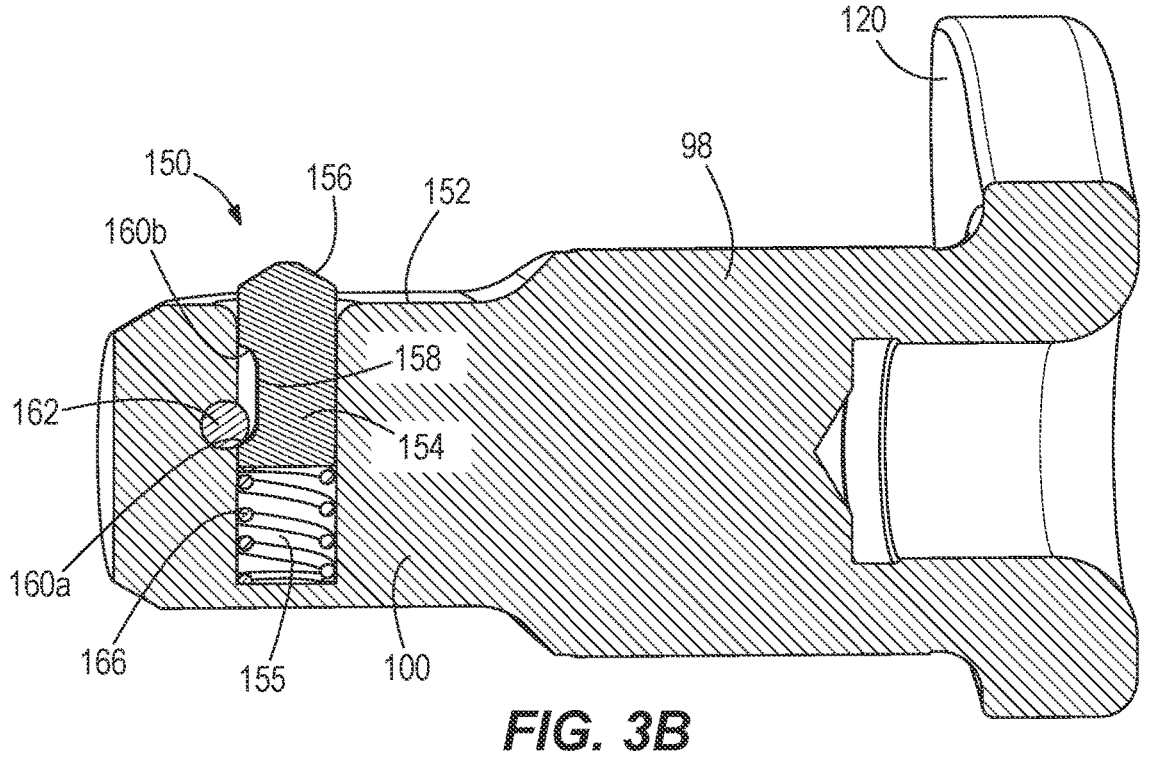
FIG. 3B is a cross-sectional view of the anvil of FIG. 3A.
Figure 3C:
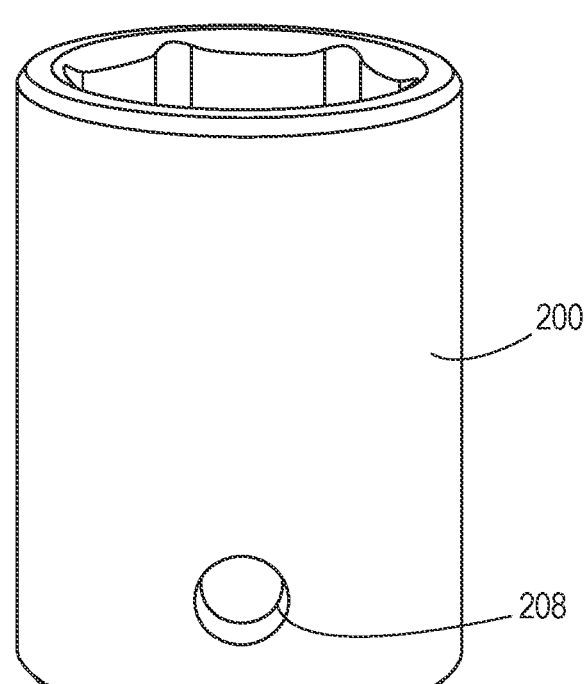
FIG. 3C is a perspective view of a tool element for use with the anvil of FIG. 3A.
Figure 3D:
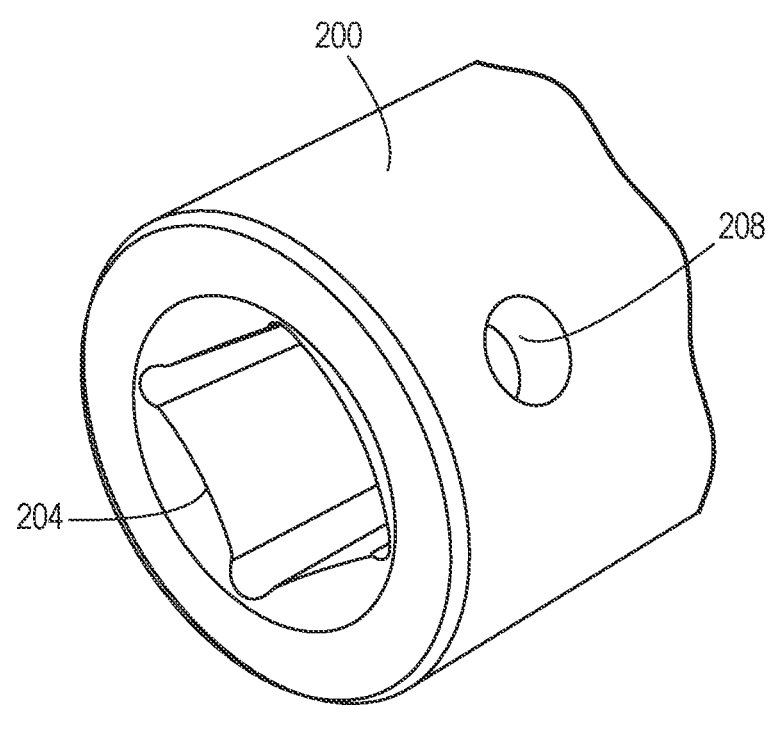
FIG. 3D is another perspective view of the tool element of FIG. 3C.

Referring to FIGS. 3A-B, the anvil 98 includes a driving end portion 100 configured to interface with a tool element 200 (e.g., a socket; FIGS. 3C-D) such that the tool element 200 is coupled for co-rotation with the anvil 98. In the illustrated embodiment, the driving end portion 100 of the anvil 98 has a generally square cross-sectional shape, with four equal-length sides 152 and a nominal size of ½ inch. The tool element 200 includes a drive bore 204 (FIG. 3D) with a corresponding shape and nominal size, such that the driving end portion 100 of the anvil 98 is insertable into the drive bore 204 to couple the tool element 200 to the anvil 98. The driving end portion 100 of the anvil 98 and the drive bore 204 of the tool element 200 may have other shapes (e.g., hexagonal, spline, etc.) and/or nominal sizes (e.g., ¾ inch, 1 inch, 1½ inch, etc.) in other embodiments.

With reference to FIGS. 3A-B, the anvil 98 includes a detent system 150 to retain the tool element 200 on the driving end portion 100 of the anvil 98. The illustrated detent system 150 includes a detent pin 154 accommodated in bore 155 formed in one of the sides 152 of the driving end portion 100. The detent system 150 also includes a detent spring 166 configured to bias the pin 154 outwardly toward an extended position, in which a tapered end 156 of the detent pin 154 projects beyond the surrounding side 152. A retaining pin 162, which intersects the bore 155, is received within a notch 158 in the detent pin 154. Engagement between the retaining pin 162 and the detent pin 154 limits movement of the detent pin 154 along the bore 155. In more detail, the notch 158 has a first end 160a and second end 160b opposite the first end (FIG. 3B). The retaining pin 162 engages the first end 160a of notch 158 when the detent pin 154 is in the extended position. The retaining pin 162 engages the second end 160b of the notch 158 when the detent pin 154 is pushed inwardly to a retracted position, in which the tapered end 156 of the detent pin 154 is positioned within the bore 155.

Figures 4, 5:
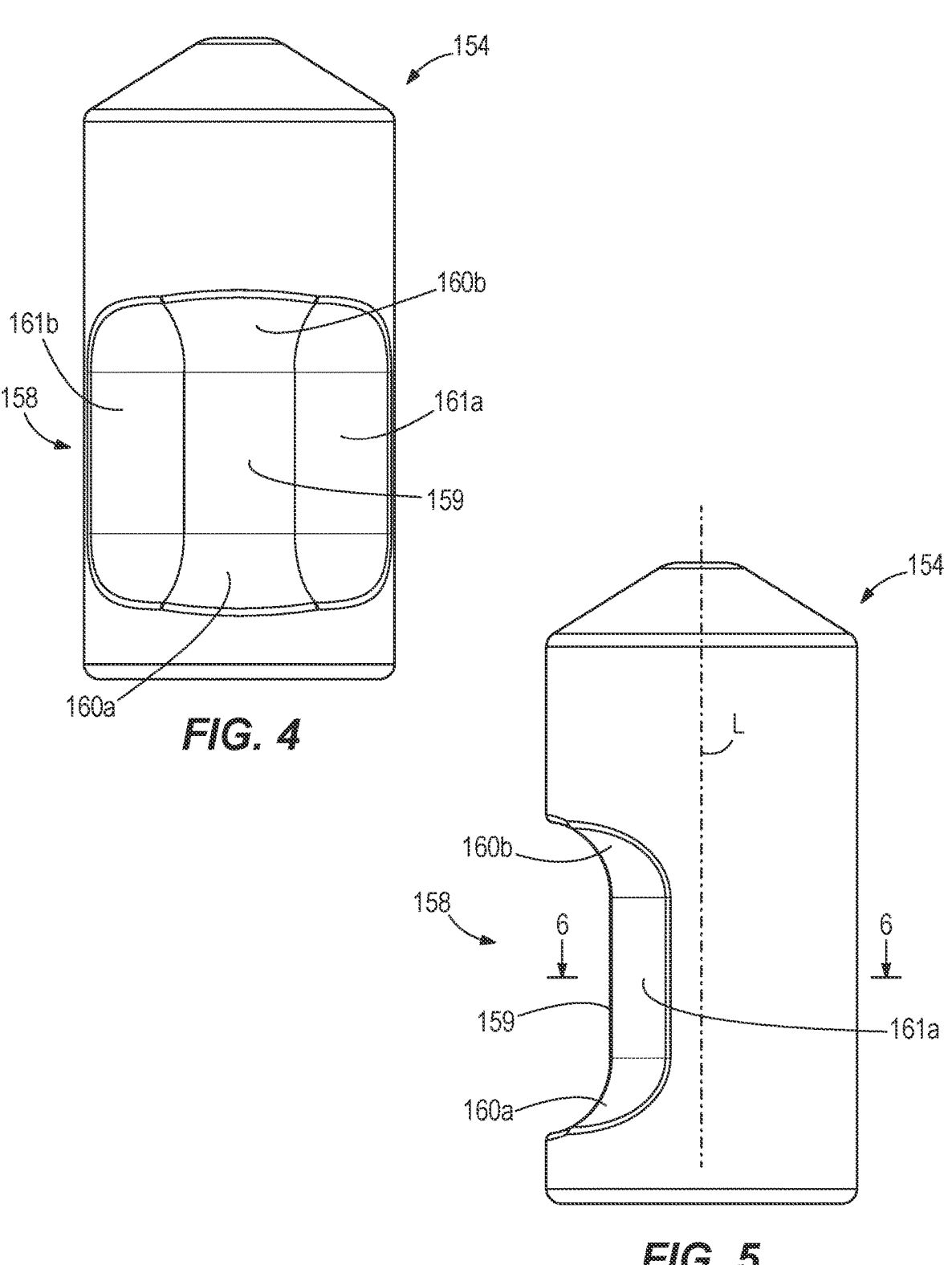
FIG. 4 is a front view of a detent pin of the anvil of FIG. 3A.
FIG. 5 is a side view of the detent pin of FIG. 4.
Figure 6:
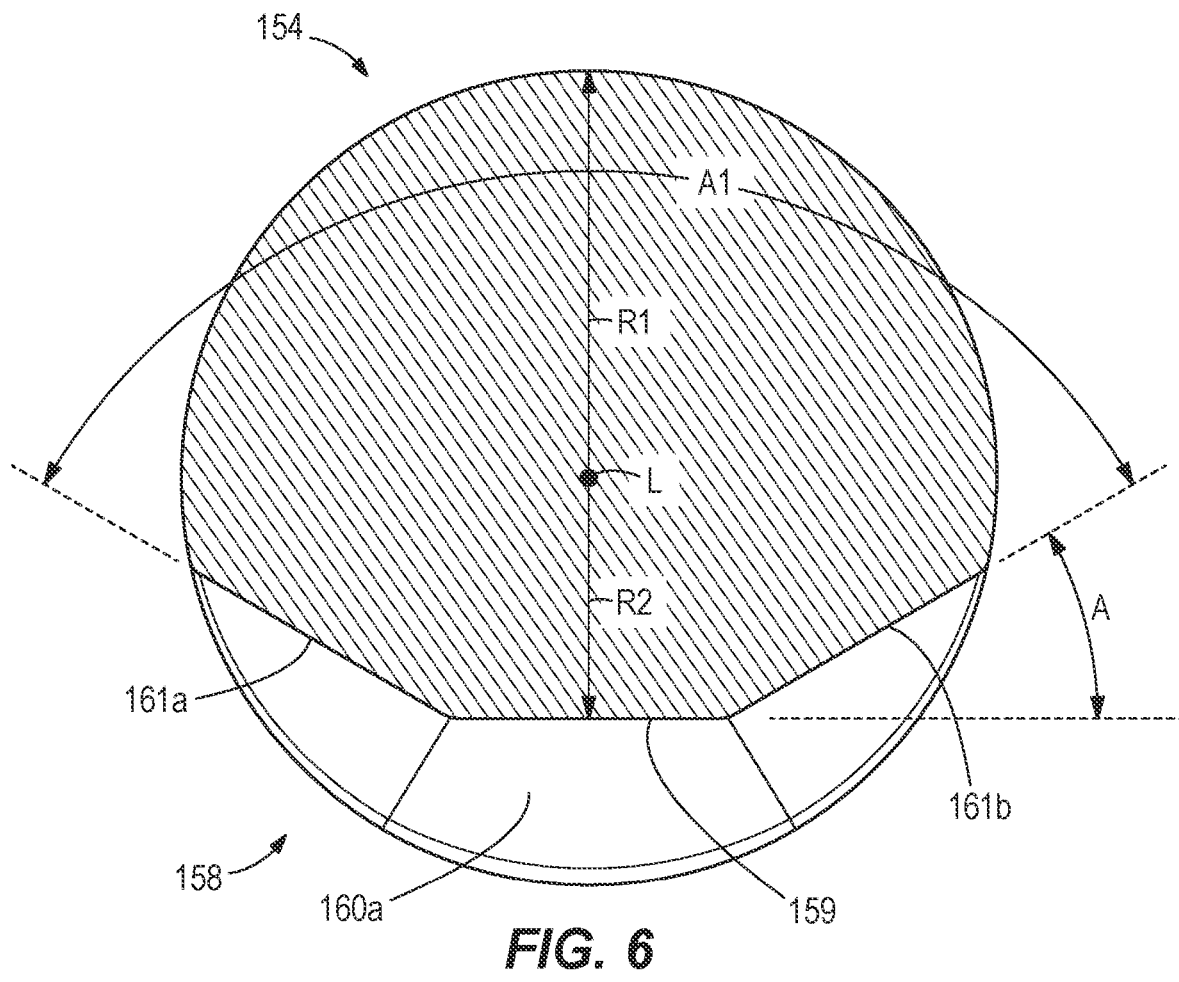
FIG. 6 is cross-sectional view of the detent pin of FIGS. 4 and 5.

With reference to FIGS. 4-6, the illustrated notch 158 includes a first surface 159, a second surface 161a, and a third surface 161b, each extending parallel to a longitudinal center axis L of the detent pin 154. The second and third surfaces 161a, 161b extend laterally from the first surface 159 at oblique angles relative to the first surface 159 (FIG. 6). The three surfaces 159, 161a, 161b curve radially outwardly at the axial ends 160a, 160b of the notch 158 to form a smooth transition between the surfaces 191, 161a, 161b and the outer profile of the detent pin 154 (FIG. 4).

Referring to FIG. 6, in the illustrated embodiment, the second and third surfaces 161a, 161b each extend from the first surface 159 at a relief angle A of 30 degrees. As such, the second and third surfaces define an included angle A1 of 120 degrees. In some embodiments of the pin 154, the angle A1 can be 120°±2°. In other embodiments, the angle A1 may be between 90 degrees and 150 degrees, or between 100 degrees and 140 degrees.

With continued reference to FIGS. 5 and 6, the detent pin 154 is not rotationally symmetrical about its longitudinal center axis L due to the shape and placement of the notch 158. For example, with reference to the plan view of the detent pin 154 illustrated in FIG. 5, the notch 158 is disposed on only one side of a longitudinal mid-plane containing the axis L. Put differently, with reference to FIG. 6, at a single position along the axis L, the detent pin 154 has a first radius R1 in a direction opposite the notch 158 and a second radius R2 intersecting the notch, with the second radius R2 being less than the first radius R1.

With reference to FIGS. 3C-D, the illustrated exemplary tool element 200 includes a bore 208 intersecting the drive opening 204. The bore 208 is sized and shaped to receive the end 156 of the detent pin 154 when the tool element 200 is coupled to the driving end portion 100 of the anvil 98. The engagement between the bore 208 and the detent pin 154 retains the tool element 200 on the driving end portion 100 of the anvil 98.

In use, to install the tool element 200 on to the anvil 98, the tool element 200 is oriented such that the bore 208 is on the same side of the anvil 98 as the detent pin 154. The tool element 200 is then pressed on to the driving end portion 100 of the anvil 98, such that the driving end portion 100 is inserted into the drive opening 204 of the tool element 200. The edge of the drive opening 204 engages the tapered end 156 of the detent pin 154 and causes the detent pin 154 to move inwardly toward its retracted position, against the biasing force of the spring 166. As the user continues pushing tool element 200 further on to the anvil 98, the bore 208 in the tool element 200 comes into alignment with the detent pin 154. The spring 166 then moves the detent pin 154 outwardly to its extended position. In the extended position, the detent pin 154 projects into the bore 208 to retain the tool element 200 on the anvil 98. The impact wrench 10 can then be used to perform a fastening operation.

The tool element 200 may be removed from the anvil 98 by inserting an object through the bore 208 and pressing the detent pin 154 inwardly toward its retracted position. Alternatively, in some embodiments, the detent system 150 may be configured to release the tool element 200 if the tool element 200 is pulled with sufficient axial force.

Because the detent pin 154 spans between the anvil 98 and the tool element 200, the detent pin 154 may experience repeated rotary impacts, resulting in high shear forces during operation of the impact wrench 10. As such, the detent pin 154 is preferably constructed from a high strength steel alloy or high carbon steels, such as S2 or 52100 steel. In addition, the detent pin 154 preferably has a surface hardness between 650-750 HV1 and a core hardness between 390-450 HV1 on the Vickers Hardness Scale. The high surface hardness and lower core hardness advantageously provides the detent pin 154 with a combination of high strength and high toughness for improved durability.

Additionally, by constructing the detent pin 154 in an asymmetrical manner such that only one side of the detent pin 154 includes the notch 158, the overall material that is removed from the pin 154 is reduced, and the strength and durability of the pin 154 are increased. The angled surfaces 161a, 161b and smooth transitions at the ends 160a, 160b also reduces stress concentrations in the pin 154 and further improve its durability.

Figure 7:
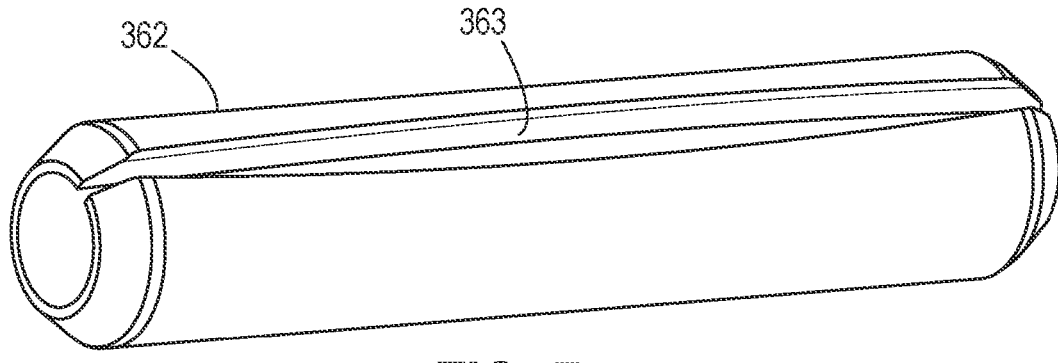
FIG. 7 is a perspective view of a spring pin, which may be incorporated into the anvil of FIG. 3A.

FIG. 7 illustrates a retaining pin 362 according to another embodiment, which may be incorporated into the detent system 150 of FIGS. 3A-B in place of the retaining pin 162. The illustrated retaining pin 362 is hollow and includes an axially-extending slot 363 extending through its sidewall. The slot 363 and hollow construction of the pin 362 allow the pin 362 to be resiliently compressible. As such, the retaining pin 362 may be resiliently compressed by the detent pin 154 when the detent pin 154 is moved toward the retracted position (e.g., during installation or removal of the tool element 200), and may then expand to return the detent pin 154 to its extended position. Thus, the retaining pin 362 may perform the functions of the spring 166, and the spring 166 may be omitted in such embodiments, resulting in reduced cost.

Various features of the invention are set forth in the following claims.

What is claimed is:

1. An impact tool comprising:
   a housing;
   an anvil extending from the housing;
   a tool element removably coupled to the anvil;
   a drive assembly configured to impart rotational impacts to the anvil;
   a detent system supported by the anvil, the detent system including:
   a detent pin defining a longitudinal center axis and having a notch disposed on only one side of a longitudinal mid-plane containing the longitudinal center axis, the notch including a first surface extending parallel to the longitudinal center axis, a second surface extending along a first lateral edge of the first surface and therefrom at an oblique angle, and a third surface extending along a second lateral edge of the first surface and therefrom at an oblique angle opposite the second surface, and
   a retaining pin received within the notch,
   wherein the detent pin is movable relative to the anvil between an extended position and a retracted position,
   wherein the detent pin is configured to engage the tool element to retain the tool element on the anvil when the detent pin is in the extended position,
   wherein the detent pin is biased toward the extended position,
   wherein the retaining pin engages an end of the notch to limit movement of the detent pin to the extended position,
   wherein the second surface and the third surface extend from the first surface toward the longitudinal mid-plane, and
   wherein the first surface, the second surface, and the third surface extend parallel to the longitudinal center axis.

2. The impact tool of claim 1, further comprising a motor supported within the housing, wherein the drive assembly is configured to convert a continuous rotational input from the motor into the rotational impacts imparted to the anvil.

3. The impact tool of claim 2, further comprising a battery pack configured to supply electrical power to the motor.

4. The impact tool of claim 1, wherein the detent system includes a spring configured to bias the detent pin toward the extended position.

5. The impact tool of claim 1, wherein the retaining pin is resiliently deformable to bias the detent pin toward the extended position.

6. The impact tool of claim 5, wherein the retaining pin is hollow.

7. The impact tool of claim 6, wherein the retaining pin includes a slot extending through a wall of the retaining pin.

8. The impact tool of claim 1, wherein the second surface and the third surface define an included angle between 90 degrees and 150 degrees.

9. The impact tool of claim 1, wherein the first surface, the second surface, and the third surface are curved at the end of the notch.

10. The impact tool of claim 1, wherein the detent pin includes a surface hardness and a core hardness, and wherein the surface hardness is greater than the core hardness.

11. An impact tool comprising:
a housing;
an anvil extending from the housing;
a tool element removably coupled to the anvil;
a drive assembly configured to impart rotational impacts to the anvil;
a detent system supported by the anvil, the detent system including:
a detent pin defining a longitudinal center axis and having a notch, and
a retaining pin received within the notch,
wherein the detent pin is movable along the longitudinal center axis relative to the anvil between an extended position and a retracted position,
wherein the detent pin is configured to engage the tool element to retain the tool element on the anvil when the detent pin is in the extended position,
wherein the retaining pin is resiliently deformable to bias the detent pin toward the extended position,
wherein the notch includes a first surface, a second surface extending along a first lateral edge of the first surface and therefrom at an oblique angle, and a third surface extending along a second lateral edge of the first surface and therefrom at an oblique angle opposite the second surface, an upper edge, and a lower edge, and
wherein the first surface, the second surface, and the third surface extend parallel to the longitudinal center axis between the upper edge and the lower edge of the notch.

12. The impact tool of claim 11, further comprising a motor supported within the housing; and a battery pack configured to supply electrical power to the motor, wherein the drive assembly is configured to convert a continuous rotational input from the motor into the rotational impacts imparted to the anvil.

13. The impact tool of claim 12, wherein the retaining pin is hollow.

14. The impact tool of claim 13, wherein the retaining pin includes a slot extending through a wall of the retaining pin.

15. The impact tool of claim 11, wherein the second surface and the third surface define an included angle between 90 degrees and 150 degrees, and wherein the first surface, the second surface, and the third surface are curved at an end of the notch.

16. An anvil configured to receive impacts from a hammer of an impact tool, the anvil comprising:
a plurality of anvil lugs configured to receive impacts from the hammer;
a driving end portion configured to receive a tool element thereon, the driving end portion including a bore;
a detent pin received within the bore and defining a longitudinal center axis, the detent pin having a notch disposed on only one side of a longitudinal mid-plane containing the longitudinal center axis, wherein the notch has a beveled configuration, and
a retaining pin received within the notch,
wherein the detent pin is movable relative to the anvil between an extended position and a retracted position,
wherein the detent pin is biased toward the extended position,
wherein the retaining pin engages an end of the notch to limit movement of the detent pin to the extended position,
wherein the notch includes a first surface, a second surface extending along a first lateral edge of the first surface and therefrom at an oblique angle, and a third surface extending along a second lateral edge of the first surface and therefrom at an oblique angle opposite the second surface,
wherein the notch defines a first end and a second end, and
wherein the first surface, the second surface, and the third surface extend longitudinally between the first end and the second end of the notch.

17. The anvil of claim 16, wherein the first surface, the second surface, and the third surface extend parallel to the longitudinal center axis, wherein the second surface and the third surface define an included angle between 90 degrees and 150 degrees, and wherein the first surface, the second surface, and the third surface are curved at the end of the notch.

* * * * *